United States Patent [19]

Yamamoto et al.

[11] Patent Number: 5,490,541
[45] Date of Patent: Feb. 13, 1996

[54] FIBROUS CASING

[75] Inventors: Tomoaki Yamamoto, Naruto; Manabu Andou, Tokushima, both of Japan

[73] Assignee: Toho Serofan Company Limited, Tokushima, Japan

[21] Appl. No.: 42,684

[22] Filed: Apr. 5, 1993

[30] Foreign Application Priority Data

Apr. 22, 1992 [JP] Japan ................... 4-129608

[51] Int. Cl.⁶ ................... F16L 11/00; A22C 13/00
[52] U.S. Cl. ................... 138/118.1; 428/34.8
[58] Field of Search ................... 138/118, 118.1, 138/177, 178; 428/34.8; 426/105, 135, 138

[56] References Cited

U.S. PATENT DOCUMENTS

| | | | |
|---|---|---|---|
| 2,101,958 | 12/1937 | Saehsenröder | 138/118.1 |
| 2,115,607 | 4/1958 | Becker | 426/135 |
| 3,214,277 | 10/1965 | Vaessen | 426/135 |
| 3,378,379 | 4/1968 | Shiner et al. | 138/118.1 |
| 4,401,135 | 8/1983 | Andrä et al. | 428/34.8 |
| 4,555,408 | 11/1985 | Gregor et al. | 138/118.1 |
| 4,623,566 | 11/1986 | Kastl et al. | 428/34.8 |
| 4,670,273 | 6/1987 | Hammer et al. | 428/34.8 |
| 5,043,194 | 8/1991 | Siebrecht et al. | 138/118.1 |

FOREIGN PATENT DOCUMENTS

| | | | |
|---|---|---|---|
| 1121503 | 1/1962 | Germany | 426/135 |
| 6163235 | 5/1979 | Japan . | |
| 7003190 | 9/1971 | Netherlands | 138/118.1 |

*Primary Examiner*—James E. Bryant, II
*Attorney, Agent, or Firm*—Lowe, Price, LeBlanc & Becker

[57] ABSTRACT

A fibrous casing, which includes a cylindrical fibrous wed and a regenerated cellulose layer formed on at least one of the inner peripheral side or the outer peripheral side of the cylindrical fibrous wed, and a yarn or a fibrous filament being embedded linearly in a longitudinal direction in the regenerated cellulose layer.

5 Claims, 1 Drawing Sheet

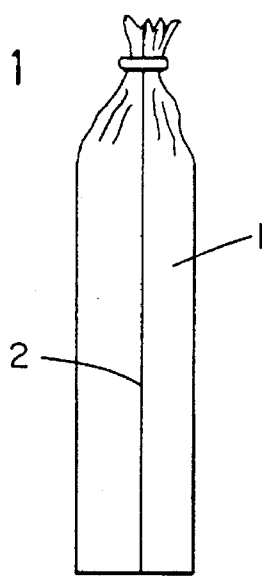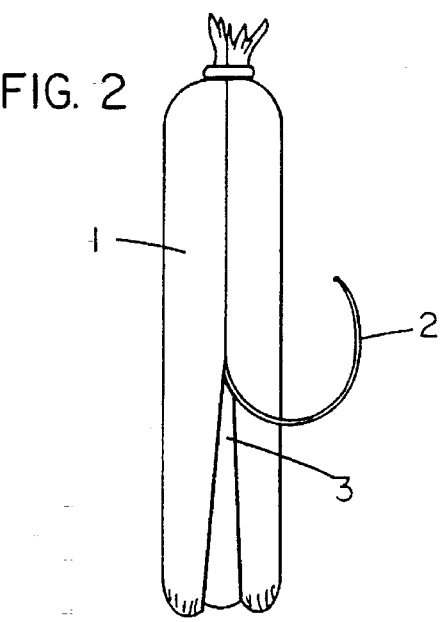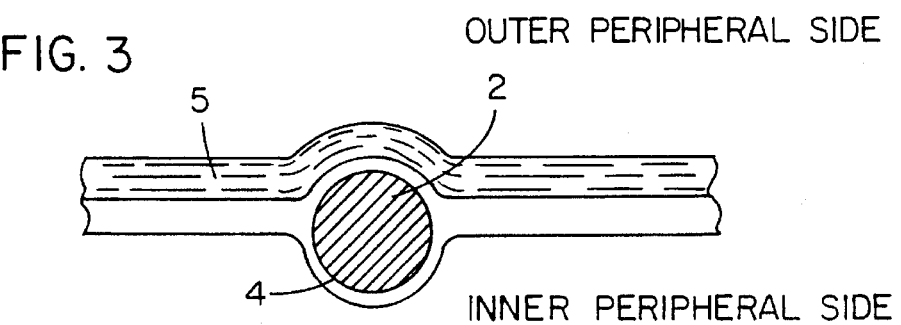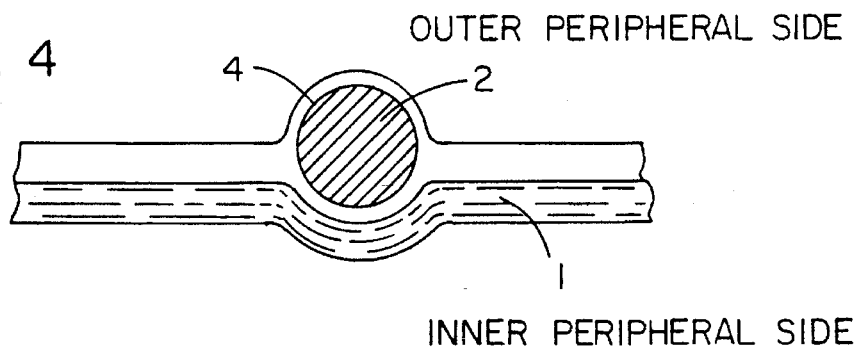

FIBROUS CASING

BACKGROUND OF THE INVENTION

1. Field of the Invention

The present invention relates to a fibrous casing, and more particularly to a fibrous casing with an improved casing peelability.

2. Description of the Prior Art

In the manufacturing of processed meat products such as ham, sausage, etc., particularly in the manufacturing of packed slices of processed meat products, meat must be packed into fibrous casings, 118–133 mm in width as folded flat and 500–2,400 mm in length to make whole muscle products for sliced-ham blister package, and then the fibrous casings must be removed therefrom to make sliced products. The fibrous casings have been so far removed by tearing the casing for the whole muscle product for sliced-ham blister package at one end, and pulling back the thus torn casing while turning the whole muscle product, thereby peeling the casing away while continuously tearing the casing. These operations have been carried out manually.

However, as a recent trend toward more efficient manufacturing of ham, sausage, etc. for slice packing, the whole muscle products for sliced-ham blister package, where ham, sausage, etc. are packed, have been longer and longer, and the manual operation of peeling the casings away has been much troublesome.

SUMMARY OF THE INVENTION

An object of the present invention is to provide a fibrous casing with an improved casing peelability for packing ham, sausage, etc.

BRIEF DESCRIPTION OF DRAWINGS

The present invention will be described with reference to the attached Drawings which are provided as non-limiting examples, in which FIG. 1 is a front view of a fibrous casing according to the present invention.

FIG. 2 is a front view of a fibrous casing according to the present invention.

FIG. 3 is an enlarged sectional view of a fibrous casing which includes a fibrous web and a regenerated cellulose layer formed on the inner peripheral side of the fibrous casing.

FIG. 4 is an enlarged sectional view of a fibrous casing which includes a fibrous web and a regenerated cellulose layer formed on the outer peripheral side of the fibrous casing.

DETAILED DESCRIPTION OF THE PREFERRED EMBODIMENTS

The object of the present invention can be attained by linearly embedding a yarn or a fibrous filament in a longitudinal direction in a regenerated cellulose layer of a fibrous casing, which comprises a cylindrical fibrous web and the regenerated cellulose layer formed on at least one of the inner peripheral side and the outer peripheral side of the cylindrical fibrous web.

A fibrous casing which comprises a cylindrical fibrous web and a regenerated cellulose layer formed on the outer peripheral side of the cylindrical fibrous web, where a yarn or yarns are embedded in a spiral or network form in the regenerated cellulose layer, is disclosed in Japanese Patent Application Kokai (Laid-open) No. 51-63235 to prevent breaking of the casing. That is, the yarn or yarns are bonded to the outer peripheral side of the web in a spiral or network form.

In the present invention, on the other hand, a linear yarn is bonded to at least one of the inner peripheral side and the outer peripheral side of the web, preferably to the inner peripheral side of the web, to help easy tearing of the casing. That is, the present invention is quite distinguished in the object and the structure from the above-mentioned prior art.

A fibrous casing for use in the present invention is the same as the conventional one and comprises a cylindrical fibrous web and a regenerated cellulose layer formed on at least one of the inner peripheral side and the outer peripheral side of the cylindrical fibrous web, where a porous paper base made from Manila hemp as the main raw material is coated and impregnated with a viscose made from wood pulp, cotton linters, etc., followed by regeneration.

In the present invention, a yarn or a fibrous filament is provided on at least one of the inner peripheral side and the outer peripheral side of the porous paper base to be made cylindrical in the forwarding direction of the porous paper base and passed together with a viscose for coating and impregnation through a die as a viscose coater. When the viscose is regenerated, the yarn or fibrous filament is linearly embedded in the regenerated cellulose layer on at least one of the inner peripheral side and the outer peripheral side of the cylindrical fibrous web in a longitudinal direction. Only by pulling the end of the yarn or fibrous filament in that state, the fibrous casing packed with a processed meat product can be torn in the longitudinal direction and thus can be easily peeled away.

As a yarn, synthetic fiber yarns of polyester, polyamide, polypropylene, etc. can be used in the present invention, and preferably cotton yarns and rayon yarns having a good adhesiveness to regenerated cellulose can be used. In the latter case, a decrease in the casing strength can be prevented. Fibrous filaments such as monofilaments can be used like yarns, but the yarns, i.e. twisted fibers have a better tearing effect, because of the larger surface area of adhesion to the regenerated celluloses.

FIG. 1 is a front view of a fibrous casing (1) according to the present invention which includes a yarn or fibrous filament (2) embedded in a regenerated cellulose layer in a longitudinal direction.

FIG. 2 is a front view of a fibrous casing according to the present invention which depicts a state in which an end of the yarn or fibrous filament (2) has been pulled to produce a longitudinal tear (3) in the casing.

FIG. 3 is an enlarged sectional view of a fibrous casing which includes a fibrous web (5) and a regenerated cellulose layer (4) formed on the inner peripheral side of the fibrous casing.

FIG. 4 is an enlarged sectional view of a fibrous casing which includes a fibrous web (5) and a regenerated cellulose layer (4) formed on the outer peripheral side of the fibrous casing.

By determining relationship between the size of one cotton yarn to be used and the casing strength, the following results were obtained, as shown in the following Table 1. It can been seen therefrom that one yarn or twisted several yarns of count number 5 or more, preferably count number 5 to 50 is preferable.

TABLE 1

| Yarn | Lateral strength(kg/15 mm) | Lateral elongation(%) |
| --- | --- | --- |
| (Without yarn) | 5.1 | 33 |
| Count No. 2 | 3.3 | 27 |
| Count No. 5 | 4.8 | 34 |
| Count No. 10 | 5.0 | 33 |

Note:
Count number is based on English Count Number, where Count No. 1 is 840 yards of a yarn having a weight of one pound.

By linearly embedding a yarn or a fibrous filament in a regenerated cellulose layer in a longitudinal direction in a fibrous casing which comprises a cylindrical fibrous web and the regenerated cellulose layer formed on at least one of the inner peripheral side and the outer peripheral side of the cylindrical fibrous web, a readily peelable fibrous casing can be obtained.

PREFERRED EMBODIMENTS OF THE INVENTION

A porous paper made from Manila hemp as the main raw material is fed from an unwinder and made into a cylindrical form, while providing a cotton yarn on the inner or outer side of the porous paper, and then led to a viscose coater and impregnated with a viscose made from wood pulp or cotton linters as the main component. It is desirable that the viscose for the impregnation is applied to the inside of the porous paper when the cotton yarn is embedded on the inner peripheral side of the web, or to the outside of the porous paper when the cotton yarn is embedded on the outer peripheral side of the web. Then, the impregnated cylindrical web is subjected to coagulation, regeneration, bleaching, water washing, softening treatment and drying.

The peelability of the thus obtained fibrous casings with a linear cotton yarn embedded in the longitudinal direction is investigated.

The results are given in the following Table 2.

TABLE 2

| Test No. | Yarn position | Cotton yarn Count No. | Peelability |
| --- | --- | --- | --- |
| 1 | Outside | No. 20 | No tearing along the yarn |
| 2 | Inside | No. 20 | Very tearable |
| 3 | Inside | No. 5 | Very tearable |
| 4 | Inside | No. 100 | Yarn was broken and hard to tear |
| 5 | Inside | No. 2 | Easy to peel, but casing strength was lowered |

What is claimed is:

1. A fibrous casing which comprises;
   a cylindrical fibrous web and a regenerated cellulose layer formed on at least an inner peripheral side or an outer peripheral side of the cylindrical fibrous web; and
   means embedded in the regenerated cellulose layer for tearing the fibrous casing along a longitudinal direction, said means for tearing comprising a strand of yarn or fibrous filament which is embedded in the regenerated cellulose layer.

2. A fibrous casing according to claim 1, wherein said means for tearing comprises a strand of yarn.

3. A fibrous casing according to claim 2, wherein the strand of yarn is made of cotton or rayon.

4. A fibrous casing according to claim 3, wherein the strand of yarn is made of cotton and has a count number of from 5 to 50.

5. A fibrous casing according to claim 4, wherein the cotton yarn is a twisted yarn.

* * * * *